April 2, 1963      K. ZYSSET      3,083,747
VEGETABLE SHREDDER
Filed March 22, 1960
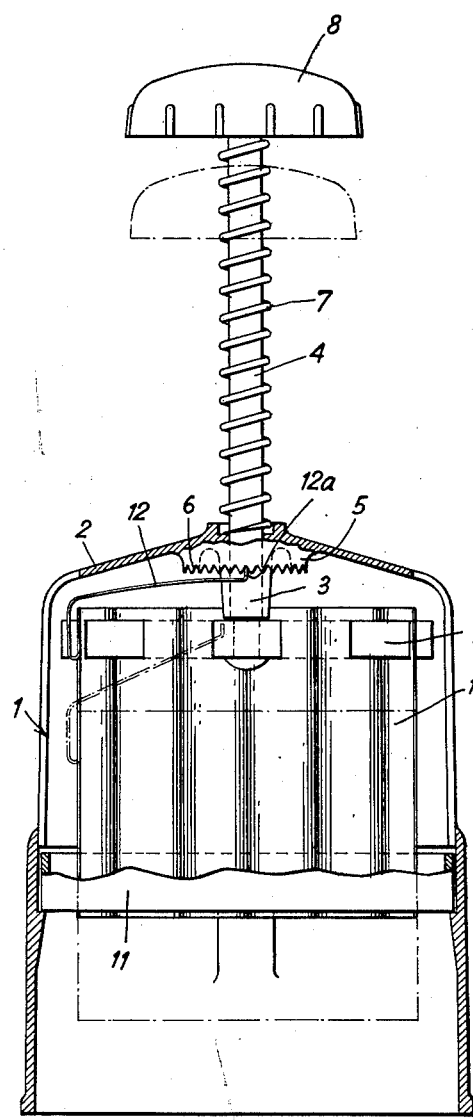
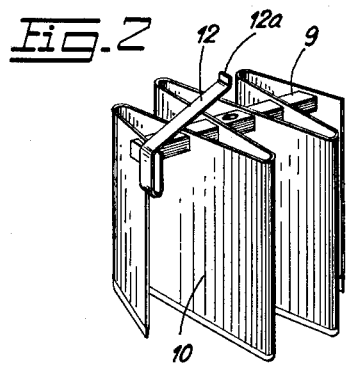
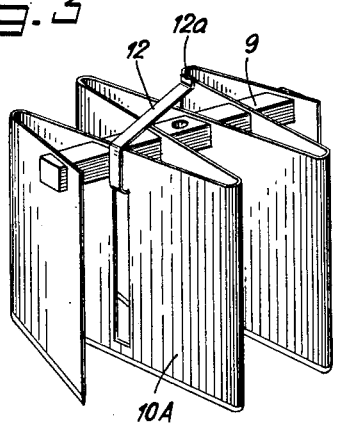
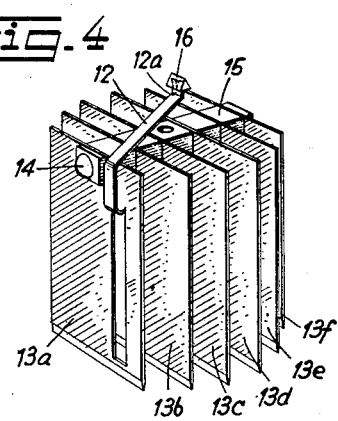
Inventor
Karl Zysset
By Stevens Davis Miller & Mosher
Attorneys

3,083,747
VEGETABLE SHREDDER
Karl Zysset, Hauptstrasse 31, Lyss, Switzerland
Filed Mar. 22, 1960, Ser. No. 16,676
Claims priority, application Switzerland Apr. 1, 1959
3 Claims. (Cl. 146—160)

My invention relates to improvements in manually operable vegetable shredders of the type which comprises a bell-like housing to be put over the goods to be shredded, at least one knife made of spring sheet steel, rotatable in said housing about the axis thereof and movable by means of an actuating member against the force of a spring towards the opening of the housing and a self-acting indexing means for stepwise rotation of the knife during its up-and-down movement.

Shredders of this type are known in various modifications, for example by my Patent No. 2,782,826. In these known shredders, the relatively complicated indexing means raises the manufacturing costs in a substantial extent.

The present invention aims to substantially decrease that portion of the manufacturing costs which pertains to the indexing means, and this by reason of the fact that the latter comprises a spring tongue integral with the knife and a circular series of projections on the underside of the ceiling of the bell-like housing.

It is true that other prior patents disclose meat choppers in which of each not only a manually rotatable crankshaft for moving up and down a bar which carries the cutting means consisting of a knife-cross, is mounted on a lid of a potlike container, but in which also a curved leaf-spring is secured to said lid and engages the rim gear of an indexing wheel secured to said bar when the latter and the cutting means are moving upwardly, for the purpose of indexing said bar and cutting means.

In contradistinction to that known cutting device, the subject matter of my present invention affords substantial improvements in various respects:

(1) In the prior meat chopper, the fact that vertical reciprocation of the bar together with the knife-cross is effected by means of a crankdrive, causes the downward stroke to decrease to zero in its lower portion. As shown in practice, however, onions and the like only can be cut up either with a drawing out or by a blowlike downward stroke of the cutting means. Further, as the bar is not guided in a transverse direction, there arise in operation tilting movements of the bar and knife-cross which lead to binding and wedging when the knife-cross in its lower terminal position is to bear on the container bottom on the entire length of its knives.

Such disadvantages are non-existent in the kind of cutting devices to which my present invention relates.

(2) In the prior meat chopper, the transverse movements of the bar and of the indexing wheel secured thereto close to the crank, which movements are produced by the crank, take place at right angles to the leaf spring. It, therefore, can hardly be avoided that the narrow tooth rim moves beside the free leaf-spring end and again gives rise to a binding or wedging action. To eliminate the latter, the lid has to be raised and the leaf-spring end has to be put back on the gear rim. Even when this derangement can be eliminated by the housewife, the device will be designated as impractical after such disorder has happened a couple of times. Such derangement cannot occur in the device disclosed by my present invention, since the bar is guided straight in the bell-like housing.

(3) In a structural respect, this prior art cannot give any hint for decreasing the cost of manufacture of the kind of cutting devices mentioned at the beginning, which decrease in the first place results from the fact that the spring tongue is integral with the sheet-metal knife.

In a preferred embodiment, the spring tongue comprises a strip-like knife portion which on one or both of its longitudinal edges has been severed from the remaining knife portion and then bent over. The knife may be made from a rectangular piece which does not comprise a lug which would have to be bent right to form the spring tongue and which would cause substantial waste. When the bell-jar housing is press-cast of plastic, for example, the projections suitably are in the form of radial ribs or serrations provided on the ceiling of the bell-like housing. The cost of the press-casting mold is practically not increased thereby. Severing a strip from the sheet metal piece also causes only a slight increase in the cost of the stamping tools. It is only the bending over of said strip to the form of the spring tongue, that requires an additional operation. It follows therefrom that the novel indexing means increases the manufacturing costs of the entire cutting device only very slightly over those of a cutting device without indexing means.

One form of the invention and two detail modifications are shown in the drawing in which FIG. 1 shows the device in elevation and partly in axial section, FIG. 2 is a perspective view of the appurtenant knife, and FIGS. 3 and 4 are perspective views of modifications of this knife.

The vegetable shredder shown in FIG. 1 which may be used for cutting up onions and other foodstuff, comprises a substantially cylindrical bell-like housing 1 which is a press-casting of plastic and of which the ceiling on its underside has a boss 3 for guiding a bar 4 and a further boss 5 which is concentric with boss 3 and has radial serrations 6. Between the ceiling 2 and an actuating knob 8 screwed to bar 4 is disposed a prestressed helical spring 7. To the lower end of bar 4 is riveted a knife-bearing traverse 9 to which is secured, in a manner konwn per se, a zigzag knife 10 made from a rectangular piece of spring sheet steel.

Knife 10 in use moves in a corresponding zigzag slot of a stripper 11 which is held axially immovable but rotatable in the housing 1.

As shown in particular in FIG. 2, a marginal strip has been severed on a portion of the height of the knife from the remaining knife portion and bent to a spring tongue 12.

When the parts and members 4, 8, 9 and 10 under the action of spring 7 move upwardly from their lower terminal position shown by dash-and-dot lines, and when they have moved through half their stroke, the upwardly bent free end 12a of spring tongue 12 enters into engagement with the serrations 6. When said parts and members are moving further upwardly, spring tongue 12 bearing on the serrations 6 is flexed and said parts and members are indexed, i.e. angularly moved through a fraction of a revolution. In the next following downstroke, the ball of the operator's thumb rests on knob 8, and the friction between said ball and knob prevents said parts and members from being turned back; the spring-tongue lug 12a then simply jumps over some of the serrations 6.

In larger sizes of the invention, suitably the knife modification 10a shown in FIG. 3 is used, lest the indexing steps become too small. It will be readily appreciated that with a given stroke of said parts and members, the size of the indexing steps decreases with an increasing length of spring tongue 12.

The invention also may be used in a known type of cutting device which comprises a number of flat rectangular knives 13a through 13f secured to a carrier pin 14 and using spacers 15. Spring tongue 12 is integral with knife 13a but could, in larger sizes and from the consideration set out above, be made integral with knife 13b for example.

In all the forms of invention, the rim of serrations may be replaced by a rim of ribs or other projections which are set farther apart from each other.

As shown in FIG. 4, the free end 12a suitably is provided with a somewhat larger plastic lug 16 so as not to unduly wear off the serrations 6. To positively anchor such lug 16, the end 12a for example may be slit on half of its width, the portions of the spring-steel sheet ends situated on both sides of the slit being slightly bent away from each other.

The same applies also to the forms of invention shown in FIGS. 1, 2 and 3.

What I claim as new and desire to secure by Letters Patent is:

1. A vegetable shredder comprising a bell-like housing adapted to be placed over the vegetables to be shredded, said housing having an upper portion having a central sleeve-like part, a one-piece rod guided in said sleeve-like part for reciprocation, a manually engageable member on the upper end of said rod and a knife assembly rigidly mounted on the lower end of said rod within said housing, a radially offset spring arm connected to said knife assembly, said spring arm being upwardly inclined and terminating at the upper end thereof in an upstanding finger, and circumferentially spaced projection means depending from the underside of said housing for engagement by said finger during the upward movement of said knife assembly preventing lateral movement of said finger whereby as said knife assembly continues to move upwardly and said spring arm is moved towards a horizontal position rotation of said knife assembly is effected.

2. A vegetable shredder in accordance with claim 1 wherein said spring arm is a strip-like portion of said knife assembly cut and bent therefrom and integrally connected thereto.

3. A vegetable shredder comprising a bell-like housing adapted to be placed over the vegetables to be shredded, said housing having an upper portion having a central sleeve-like part, a one-piece rod guided in said sleeve-like part for reciprocation, a manually engageable member on the upper end of said rod and a knife assembly rigidly mounted on the lower end of said rod within said housing, a radially offset spring arm connected to said knife assembly, said spring arm being upwardly inclined and terminating at the upper end thereof in an upstanding finger, and means carried by said housing for engagement by said finger during upward movement of said knife assembly preventing lateral movement of said finger whereby as said knife assembly continues to move upwardly and said spring arm is moved towards a horizontal position rotation of said knife assembly is effected, wherein said finger engaging means are in the form of circumferentially spaced ribs depending from the underside of said housing upper portion and disposed generally concentric to said sleeve-like part.

References Cited in the file of this patent
UNITED STATES PATENTS

| | | |
|---|---|---|
| 137,074 | Hard | Mar. 25, 1873 |
| 2,422,340 | Clark | June 17, 1947 |
| 2,782,826 | Zysset | Feb. 26, 1957 |